3,108,068
WATER-IN-OIL EMULSION DRILLING FLUID
Walter J. Weiss and Richard H. Graves, Houston, Tex., assignors to Texaco Inc., New York, N.Y., a corporation of Delaware
No Drawing. Filed Dec. 5, 1960, Ser. No. 73,532
7 Claims. (Cl. 252—8.5)

This invention relates to drilling fluids. More particularly, this invention relates to water-in-oil emulsion drilling fluids.

In a water-in-oil emulsion drilling fluid oil is the continuous liquid phase and water is the discontinuous or dispersed liquid phase. Oil base drilling fluids such as water-in-oil emulsion drilling fluids are sometimes employed in a drilling operation as a completion fluid, particularly when drilling through water-sensitive petroleum producing formations, or as a regular drilling fluid when water-sensitive formations, such as formations which contain hydratable shale, are encountered.

When a water-in oil emulsion drilling fluid is employed in a drilling operation either as a regular drilling fluid or as a well completion fluid, theoretically the only filtrate from the drilling fluid into the formation being drilled is oil. Accordingly, no damage is expected within a water-sensitive formation when the filtrate oil penetrates the same. Sometimes, however, due to drilling conditions the water-in-oil emulsion may break down into an oil-in-water emulsion. When breakdown occurs water appears in the filtrate and some damage, such as impaired oil permeability, might result within a water-sensitive petroleum producing formation. Accordingly, one disadvantage of a water-in-oil emulsion drilling fluid is its instability, that is, a water-in-oil emulsion drilling fluid may change to an oil-in-water emulsion drilling fluid during the drilling operation and cause damage to a water-sensitive formation. When this change or inversion occurs within a water-sensitive petroleum producing formation or when water appears in substantial amounts in the filtrate from a water-in-oil emulsion drilling fluid damage, such as impaired oil permeability and productivity of the producing formation sometimes results.

Accordingly, it is an object of this invention to provide an improved, more stable water-in-oil emulsion drilling fluid.

Still another object of this invention is to provide a method for the preparation of a water-in-oil emulsion drilling fluid.

Yet another object of this invention is to provide a method for drilling through water-sensitive petroleum producing formations.

Still another object of this invention is to provide a drilling method wherein an improved, more stable water-in-oil emulsion is employed as the drilling fluid.

How these and other objects of this invention are accomplished will become apparent with reference to the accompanying disclosure. In at least one embodiment of the practice of this invention at least one of the foregoing objects will be obtained.

It has now been discovered that an improved water-in-oil emulsion drilling fluid is obtained when an alkaline aqueous solution saturated with respect to calcium hydroxide and containing sufficient additional soluble calcium salts to increase the calcium ion or dissolved calcium concentration by more than 200 parts per million by weight above that arising from simple calcium hydroxide solubility is employed as the dispersed water phase in the water-in-oil emulsion drilling fluid. A water-in-oil emulsion drilling fluid prepared in accordance with this invention and having the dispersed alkaline aqueous phase described hereinabove exhibits greater stability (less likely to invert) and less sensitivity to gypsum, cement contamination, salt contamination and the like during a drilling operation.

Satisfactory results are obtainable when the dispersed alkaline aqueous phase has a pH less than 12.6, such as a pH in the range 10.2–11.6. Also, satisfactory results are obtainable when the calcium ion or dissolved calcium concentration in the alkaline aqueous phase is substantially in excess of 200 parts per million by weight, such as a calcium concentration in the range 300–1500 p.p.m., above the calcium ion or calcium concentration arising from simple calcium hydroxide solubility. Further, it is a noteworthy characteristic of the dispersed alkaline aqueous phase that it is saturated with respect to calcium hydroxide, i.e., sufficient lime or calcium hydroxide is present in the drilling fluid to maintain the dispersed aqueous phase therein saturated with respect to calcium hydroxide.

Various methods may be employed in the preparation of a water-in-oil emulsion fluid in accordance with this invention. For example, an aqueous solution containing added lime or calcium hydroxide together with a water soluble calcium salt which evidences a greater solubility in water than calcium hydroxide might first be prepared and then dispersed in oil as the dispersed aqueous phase in the resulting water-in-soil emulsion. Another method for the preparation of the water-in-oil emulsion drilling fluid in accordance with this invention involves the addition of lime or calcium hydroxide and a water soluble calcium salt either as solids or as a relatively concentrated aqueous solution in amounts sufficient to impart to the dispersed aqueous phase properties and characteristics desired in accordance with this invention. Various other methods for the preparation of a water-in-oil emulsion drilling fluid in accordance with this invention will suggest themselves to those skilled in the art in the light of this disclosure.

Usually it is a characteristic of water-in-oil emulsion drilling fluids that the continuous oil phase comprises a major portion of the liquid phases therein. Accordingly, in a water-in-oil emulsion drilling fluid prepared in accordance with this invention oil might comprise 50%, more or less, by volume, based on the total oil and water liquid phases. Satisfactory water-in-oil emulsion drilling fluids wherein the continuous phase (oil) comprises 50 through 95% by volume of the liquid phases are obtainable in the practice of this invention. Likewise, alternatively, satisfactory water-in-oil emulsion drilling fluids are obtainable wherein the alkaline aqueous phase in accordance with this invention constitutes or comprises 5 through 50, more or less, percent by volume of the liquid phases.

In the preparation of a water-in-oil emulsion drilling fluid in accordance with this invention any suitable oil might be employed. It is desirable, however, to employ an oil which would present relatively little fire hazard during the drilling operation. Diesel oil, kerosene, gas oils and heavy or light lubricating oil petroleum fractions are suitable. These oils are characterized by a relatively low or reduced vapor pressure under the conditions of use.

The calcium hydroxide which saturates the dispersed alkaline aqueous phase of drilling fluids in accordance with this invention may be added directly as slaked lime or may be generated in situ by the addition of unslaked or burnt lime to water or may be generated in situ by metathetical reaction involving a relatively water soluble calcium salt such as calcium chloride, calcium sulfate or calcium acetate and the like and an alkali metal hydroxide such as sodium hydroxide. These materials, e.g., calcium chloride and sodium hydroxide, react to produce calcium hydroxide.

Any water soluble calcium salt to yield an aqueous phase which has a calcium ion concentration in excess of 200 parts per million by weight, above the calcium ion concentration arising from simple calcium hydroxide solubility based on the aqueous solution, might be employed in the practice of this invention provided the calcium salt evidences a solubility in water greater than that of calcium hydroxide. Suitable water soluble calcium salts include calcium chloride, calcium sulfate, calcium nitrate, calcium acetate and calcium formate. Other suitable water soluble calcium salts are also known.

In the preparation of stable water-in-oil emulsions a suitable emulsifying agent for the formation of a water-in-oil emulsion is generally employed in conventional amounts, such as, for example from about 1 pound to about 100 pounds per barrel of emulsion more or less. Suitable emulsifying agents for the preparation of stable water-in-oil emulsions are known in the art. A particularly suitable emulsifying agent for use in the water-in-oil emulsions of the present invention comprises a calcium salt of an oxidized tall oil which may contain an excess of lime. Other commercially available emulsifying agents for the formation of water-in-oil emulsions include sulfated vegetable and animal oils, such as sulfated sperm oil, sulfated alcohols, organic sulfonates and the alkali metal salts thereof, see U.S. 2,661,334, U.S. 2,793,187, U.S. 2,793,188 and U.S. 2,793,189, the disclosures of which are herein incorporated and made part of this disclosure.

In addition to water, oil, a conventional emulsifying agent for forming water-in-oil emulsions, together with calcium hydroxide and a water soluble calcium salt, there may be present such materials as weighting agents, e.g., lead sulfide, ion sulfide (pyrites) and the like, all of which are preferentially oil wetted, plastering agents such as asphalt, bitumens and tar-like materials, graphite and solid carbon particles such as carbon black which serve to impart lubricity and/or to improve the viscosity of the water-in-oil emulsion drilling fluids and/or the filtrate loss properties. Other materials which may be added include suspending agents for the materials drilled out during the drilling operation, water loss improving agents and other stabilizing agents. Lignosulfonates, such as sodium lignosulfonate, and particularly calcium lignosulfonate, which are also effective as thinning and emulsifying agents in drilling fluids, as set forth in the test data in the accompanying tables improve the stability of the water-in-oil emulsions prepared in accordance with this invention. Accordingly, in the practice of this invention it is desirable to incorporate in the water-in-oil emulsion drilling fluid containing a conventional emulsifying agent in customary amounts, and lignosulfonates such as calcium lignosulfonate, e.g., Kembreak, in order to improve the stability of the water-in-oil emulsion. These lignosulfonate stabilizing agents are incorporated in minor amounts in the whole drilling fluid, i.e., the water-in-oil emulsion, or into the aqueous phase thereof. Usually an amount of these stabilizing agents in the range 1-15% by weight is sufficient. These stabilizing agents may be incorporated with the lime and water soluble calcium salt when these materials are employed in the preparation of water-in-oil emulsion drilling fluids as set forth hereinabove.

The following examples are illustrative of the advantages and benefits obtainable in the practice of this invention. As the test data set forth in the accompanying tables indicate, the stabiliy of the water-in-oil emulsions is improved wherein the dispersed aqueous phase has characteristics in accordance with this invention. Further, as the test data indicates not only is the emulsion stability improved as evidenced by an increased breakdown voltage but also the appearance of aqueous phase in the filtrate is reduced upon contamination of the water-in-oil emulsion drilling fluid with gypsum (calcium sulfate), cement, salt and saturated salt brine contamination, oil addition and contamination with hydrated solids.

TABLE I

Uncontaminated Water-in-Oil Emulsions

| Emulsion No. | Emulsion tested | Breakdown voltage in volts | Breakdown voltage after 16 hours at 200° F. in volts after 5 min. stirring |
|---|---|---|---|
| 1 | Water-in-oil emulsion comprising 60% diesel oil, 40% saturated salt water and containing an emulsifying agent comprising a calcium salt of oxidized tall oil in an amount of 50 pounds of emulsifying agent per barrel of emulsion. | 138 | 84 |
| 2 | Same as No. 1 with addition of 2 lbs. CaCl₂ and 5 lbs. lime, respectively, per barrel of aqueous phase. | 150 | 84 |
| 3 | Same as No. 1 with addition of 10 lbs. per barrel of aqueous phase of an admixture of calcium chloride, lime and calcium lignosulfonate in the weight ratio 0.4:4:4. | 120 | 103 |

TABLE II

Gypsum Contamination

| Emulsion tested | Contaminated with 5 lbs. per bbl. gypsum | | Contaminated with 10 lbs. per bbl. gypsum—Breakdown voltage after 16 hours at 200° F. in volts after 5 min. stirring |
|---|---|---|---|
| | Breakdown voltage in volts | Breakdown voltage after 16 hrs. at 200° F. in volts | |
| Emulsion No. 1 | 174 | 90 | 72 |
| Emulsion No. 2 | 198 | 105 | 78 |
| Emulsion No. 3 | 198 | 120 | 78 |

TABLE III

Cement Contamination

| Emulsion tested | Contaminated with 5 lbs. per bbl. cement | | Contaminated with 10 lbs. per bbl. cement | | Filter loss at 100 p.s.i. for 30 min. in milliliters at 300° F. | |
|---|---|---|---|---|---|---|
| | Breakdown voltage in volts | Breakdown voltage after 16 hours at 200° F. in volts | Breakdown voltage in volts | Breakdown voltage after 16 hours at 200° F. in volts | H₂O | Oil |
| No. 1 | 72 | 65 | 66 | 60 | 3.0 | 4.0 |
| No. 2 | 84 | 63 | 66 | 60 | 2.0 | 6.0 |
| No. 3 | 84 | 72 | 150 | 72 | 1.8 | 5.0 |

TABLE IV

Salt Contamination

| Emulsion tested | Contaminated with 5 lbs. per bbl. salt (NaCl) | | Contaminated with 10 lbs. per bbl. salt (NaCl) | | | Filter loss at 100 p.s.i. for 30 min. in milliliters at 300° F. | |
|---|---|---|---|---|---|---|---|
| | Breakdown voltage in volts | Breakdown voltage after 16 hours at 200° F. | Breakdown voltage in volts | Breakdown voltage after 16 hrs. at 200° F. in volts | | H₂O | Oil |
| | | | | Before stirring | After 5 min. stirring | | |
| No. 1 | 54 | 48 | 72 | 45 | 60 | 3.5 | 5.0 |
| No. 2 | 73 | 90 | 60 | 54 | 72 | 1.0 | 5.0 |
| No. 3 | 96 | 84 | 78 | 60 | 78 | 1.4 | 3.5 |

TABLE V

*Saturated Salt (NaCl) Brine Contamination*

| Emulsion tested | 15% brine added | | |
|---|---|---|---|
| | Breakdown voltage in volts | Filter loss 100 p.s.i. for 30 min. 300° F. in milliliters | |
| | | $H_2O$ | Oil |
| No. 1 | 20 | 13.0 | 8.0 |
| No. 2 | 25 | 7.0 | 6.0 |
| No. 3 | 25 | 11.0 | 3.8 |

TABLE VI

*Contamination with Hydrated Formation Solids* [1]

| Emulsion tested | Solids added in lbs. per bbl. | Breakdown voltage in volts | Breakdown voltage after 16 hrs. at 200° F. | | Filter loss 100 p.s.i. for 30 min. at 300° F. in milliliters | |
|---|---|---|---|---|---|---|
| | | | Before stirring | After 5 min. stirring | $H_2O$ | Oil |
| No. 1 | 20 | 120 | 90 | 66 | 4.2 | 3.0 |
| | 40 | 36 | 36 | 30 | 6.0 | 3.5 |
| | 60 | 48 | 48 | 51 | 11.6 | 4.0 |
| | 80 | 54 | 42 | 42 | 14.0 | 4.0 |
| No. 2 | 20 | 108 | 84 | 84 | 1.0 | 3.0 |
| | 40 | 90 | 60 | 90 | 0.5 | 2.5 |
| | 60 | 60 | 48 | 54 | 0 | 2.5 |
| | 80 | | | | 0 | 2.0 |
| No. 3 | 20 | 135 | 90 | 108 | 1.5 | 4.0 |
| | 40 | 90 | 42 | 90 | 2.0 | 3.5 |
| | 60 | 84 | 36 | 84 | | |
| | 80 | 84 | 36 | 90 | | |

[1] Hydrated solids employed obtained by preparing a slurry of clay in water, filtering slurry, and employing the filtered clay solids to represent drilled formation solids.

As will be apparent to those skilled in the art many substitutions, modifications and alterations in the practice of this invention are possible without departing from the spirit or scope thereof.

This application is a continuation-in-part of our application Serial No. 698,339, filed November 25, 1957, now abandoned.

We claim:

1. A water-in-oil emulsion drilling fluid comprising 50 to 95% oil by volume as the continuous phase, and a disperse phase consisting essentially of an alkaline aqueous solution having a pH less than 12.6 saturated with calcium hydroxide and containing a sufficient amount of a water soluble calcium salt having a solubility greater than calcium hydroxide to increase the calcium ion concentration by more than 200 parts per million by weight above that arising from simple calcium hydroxide solubility, an emulsifying agent consisting essentially of a calcium salt of oxidized tall oil effective for dispersing said aqueous solution in said oil, and 1–15% by weight calcium lignosulfonate, said calcium lignosulfonate being sufficient to improve the stability of the water-in-oil emulsion against inversion in the presence of at least one contaminant selected from the group consisting of gypsum, cement and salt.

2. A method of drilling which comprises circulating a water-in-oil emulsion drilling fluid down the drill stem, about the drilling bit and upwardly through the well bore while drilling through subterranean formations with said drilling bit, said water-in-oil emulsion drilling fluid comprising 50 to 95% oil by volume of oil as the continuous phase and a disperse phase consisting essentially of an alkaline aqueous solution having a pH less than 12.6 saturated with calcium hydroxide and containing a sufficient amount of a water soluble calcium salt having a solubility greater than calcium hydroxide dissolved therein to increase the calcium ion concentration in said aqueous solution by more than 200 parts per million by weight above that arising from simple calcium hydroxide solubility, an emulsifying agent consisting essentially of a calcium salt of oxidized tall oil effective for dispersing said aqueous solution in said oil, and 1–15% by weight based on said drilling fluid of calcium lignosulfonate, said calcium lignosulfonate being sufficient to improve the stability of the water-in-oil emulsion against inversion in the presence of at least one contaminant selected from the group consisting of gypsum, cement and salt.

3. A composition in accordance with claim 1 wherein said water soluble calcium salt is calcium chloride.

4. A composition in accordance with claim 1 wherein said water soluble calcium salt is calcium sulfate.

5. A composition in accordance with claim 1 wherein said calcium salt is calcium acetate.

6. A composition in accordance with claim 1 wherein said calcium salt is calcium nitrate.

7. A composition in accordance with claim 1 wherein said calcium salt is calcium formate.

References Cited in the file of this patent

UNITED STATES PATENTS

| | | |
|---|---|---|
| 2,476,845 | Dawson | July 19, 1949 |
| 2,793,188 | Swain et al. | May 21, 1957 |
| 2,802,783 | Weiss et al. | Aug. 13, 1957 |
| 2,861,042 | Watkins | Nov. 18, 1958 |
| 2,862,881 | Reddie | Dec. 2, 1958 |
| 2,876,197 | Watkins | Mar. 3, 1959 |
| 2,930,755 | Crittendon | Mar. 29, 1960 |